United States Patent
Liao

(10) Patent No.: US 11,105,386 B2
(45) Date of Patent: Aug. 31, 2021

(54) BRAKE CALIPER DEVICE HAVING AUTOMATIC PAD WEAR COMPENSATION MECHANISM

(71) Applicant: Chih-Hsien Liao, Taichung (TW)

(72) Inventor: Chih-Hsien Liao, Taichung (TW)

(73) Assignee: Chih-Hsien Liao, Taichung (TW)

( * ) Notice: Subject to any disclaimer, the term of this patent is extended or adjusted under 35 U.S.C. 154(b) by 101 days.

(21) Appl. No.: 16/743,814

(22) Filed: Jan. 15, 2020

(65) Prior Publication Data

US 2021/0215213 A1  Jul. 15, 2021

(51) Int. Cl.
*F16D 65/097* (2006.01)
*F16D 65/62* (2006.01)
*F16D 65/00* (2006.01)
*F16D 55/00* (2006.01)

(52) U.S. Cl.
CPC ..... *F16D 65/0972* (2013.01); *F16D 65/0075* (2013.01); *F16D 65/62* (2013.01); *F16D 2055/0095* (2013.01)

(58) Field of Classification Search
CPC ........... F16D 65/092; F16D 2055/0016; F16D 55/226; F16D 65/0068; F16D 2055/0041; F16D 2065/1364; F16D 2121/04; F16D 2125/60; F16D 3/06; F16D 55/16; F16D 55/224; F16D 55/2262; F16D 65/00; F16D 65/38; F16D 65/40
See application file for complete search history.

(56) References Cited

U.S. PATENT DOCUMENTS

| 3,638,763 | A | * | 2/1972 | Laverdant | F16D 65/567 188/72.6 |
| 4,154,321 | A | * | 5/1979 | Falk | B60T 1/065 188/71.9 |
| 4,619,347 | A | * | 10/1986 | Schreiner | F16D 65/18 188/106 F |
| 4,721,190 | A | * | 1/1988 | Schmidt | F16D 65/567 188/71.9 |
| 4,981,197 | A | * | 1/1991 | Antony | F16D 65/18 188/196 D |
| 5,038,895 | A | * | 8/1991 | Evans | F16D 65/567 188/72.7 |

(Continued)

FOREIGN PATENT DOCUMENTS

| GB | 968897 | A | * | 9/1964 | ........... F16D 65/567 |
| GB | 2336188 | A | * | 10/1999 | ........... F16D 65/567 |

*Primary Examiner* — Robert A. Siconolfi
*Assistant Examiner* — Mahbubur Rashid
(74) *Attorney, Agent, or Firm* — Fox Rothschild LLP; Robert J. Sacco; Carol E. Thorstad-Forsyth

(57) ABSTRACT

A brake caliper device is adapted to be used with a brake disk, and includes a main body unit, first and second pads, and a caliper actuator unit. The caliper actuator unit includes an actuating member, a bolt member that abuts against the actuating member, and a threaded sleeve that is threadedly engaged to the bolt member. When the actuating member is driven by an external force, the actuating member is capable of vibrating axially to cause an axial vibration of the bolt member, which prompts the threaded sleeve to rotate relative to the bolt member for pushing the first pad toward the brake disk, thereby automatically providing a travel stroke that compensates for pad wear.

10 Claims, 7 Drawing Sheets

(56) References Cited

U.S. PATENT DOCUMENTS

| | | | | |
|---|---|---|---|---|
| 5,086,885 | A * | 2/1992 | Bowsher | F16D 65/18 |
| | | | | 188/196 D |
| 5,123,505 | A * | 6/1992 | Antony | F16D 65/567 |
| | | | | 188/196 D |
| 5,586,623 | A * | 12/1996 | Mery | F16D 65/18 |
| | | | | 188/72.6 |
| 5,868,225 | A * | 2/1999 | Hulliger | F16D 65/567 |
| | | | | 188/72.4 |
| 6,311,807 | B1 * | 11/2001 | Rinsma | F16D 65/18 |
| | | | | 188/71.9 |
| 7,331,432 | B2 * | 2/2008 | Watada | F16D 65/18 |
| | | | | 188/72.7 |
| 8,474,579 | B2 * | 7/2013 | Hyun | F16D 55/226 |
| | | | | 188/71.9 |
| 9,163,684 | B2 * | 10/2015 | Hong | F16D 65/543 |
| 9,347,506 | B2 * | 5/2016 | Kim | F16D 55/226 |
| 9,803,711 | B2 * | 10/2017 | Sandberg | F16D 65/0043 |
| 10,066,692 | B2 * | 9/2018 | Sandberg | F16D 65/567 |
| 2004/0026181 | A1 * | 2/2004 | Baumgartner | F16D 55/227 |
| | | | | 188/71.7 |
| 2017/0297434 | A1 * | 10/2017 | Kaneda | F16D 65/183 |
| 2017/0307035 | A1 * | 10/2017 | Henning | F16D 65/18 |

* cited by examiner

BRAKE CALIPER DEVICE HAVING AUTOMATIC PAD WEAR COMPENSATION MECHANISM

FIELD

The disclosure relates to a brake caliper device, and more particularly to a brake caliper device having automatic pad wear compensation mechanism.

BACKGROUND

A conventional brake caliper device disclosed in Taiwanese Utility Model Patent No. M394267 includes a main body unit, a rocker arm unit that is rotatably coupled to the main body unit, two pad units, a brake cable unit and a hydraulic piston unit, and is adapted to be used with a brake disk for braking. The main body unit has an operating space, the rocker arm unit has two rocker arms respectively and rotatably coupled to two opposite sides of the operating space, each of the pad units has a pad that is adapted to be disposed between a corresponding one of the rocker arms and the brake disk, and the brake cable unit has an outer tube and a steel cable extending therethrough. One end of the outer tube abuts against aside of one of the rocker arms, and the steel cable has a sleeved end portion that is fixedly embedded to the other one of the rocker arms, and a lever end portion that is operable to be pulled by a handbrake lever.

A user is permitted to perform brake operation via a brake pedal, which triggers the hydraulic piston unit to drive the pad units to abut against the brake disk, or via the handbrake lever, which triggers the brake cable unit to pull the rocker arms to drive the pad units to abut against the brake disk.

Another conventional brake caliper device disclosed in Taiwanese Utility Model Patent No. M415088 includes a main body unit, a piston unit, a pad unit and a handbrake unit. The main body unit has two opposite sides and an operating space, the pad unit has two positioning members that are connected to the piston unit and two pads respectively mounted to the positioning members, and the handbrake unit has an actuating member and two abutment members respectively disposed in proximity to the opposite sides of the main body unit. The abutment members are driven by first and second actuating portions of the actuating member to move away from the sides to push the two pads toward a brake disk for braking.

However, the pad units of the abovementioned brake caliper devices may wear off over a period of time under regular usage, causing to braking to be less effective if the devices are not regularly maintenance and replaced.

SUMMARY

Therefore, an object of the disclosure is to provide a brake caliper device that can alleviate the drawback of the prior art.

According to the disclosure, the brake caliper device is adapted to be used with a brake disk, which has a first side surface and a second side surface opposite to the first side surface. The brake caliper device includes a main body unit, first and second pads, and a caliper actuator unit. The main body unit includes a first seat that is adapted to be disposed proximally to the first side surface of the brake disk, and that is formed with a mounting hole extending along a mounting axis (L), and a second seat that is co-movably connected to the first seat, that is adapted to be disposed proximally to the second side surface of the brake disk, and that cooperates with the first seat to define a receiving space therebetween for receiving a part of the brake disk.

The first pad is adapted to be disposed between the first seat and the first side surface of the brake disk, and the second pad is adapted to be disposed between the second seat and the second side surface of the brake disk.

The caliper actuator unit is mounted to the mounting hole of the first seat, and includes an actuating member, a bolt member that abuts against the actuating member, and a threaded sleeve that is threadedly engaged to the bolt member. When the actuating member is driven by an external force, the actuating member is capable of vibrating axially to cause an axial vibration of the bolt member, which prompts the threaded sleeve to rotate relative to the bolt member for pushing the first pad toward the brake disk, thereby automatically providing a travel stroke that compensates for pad wear.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
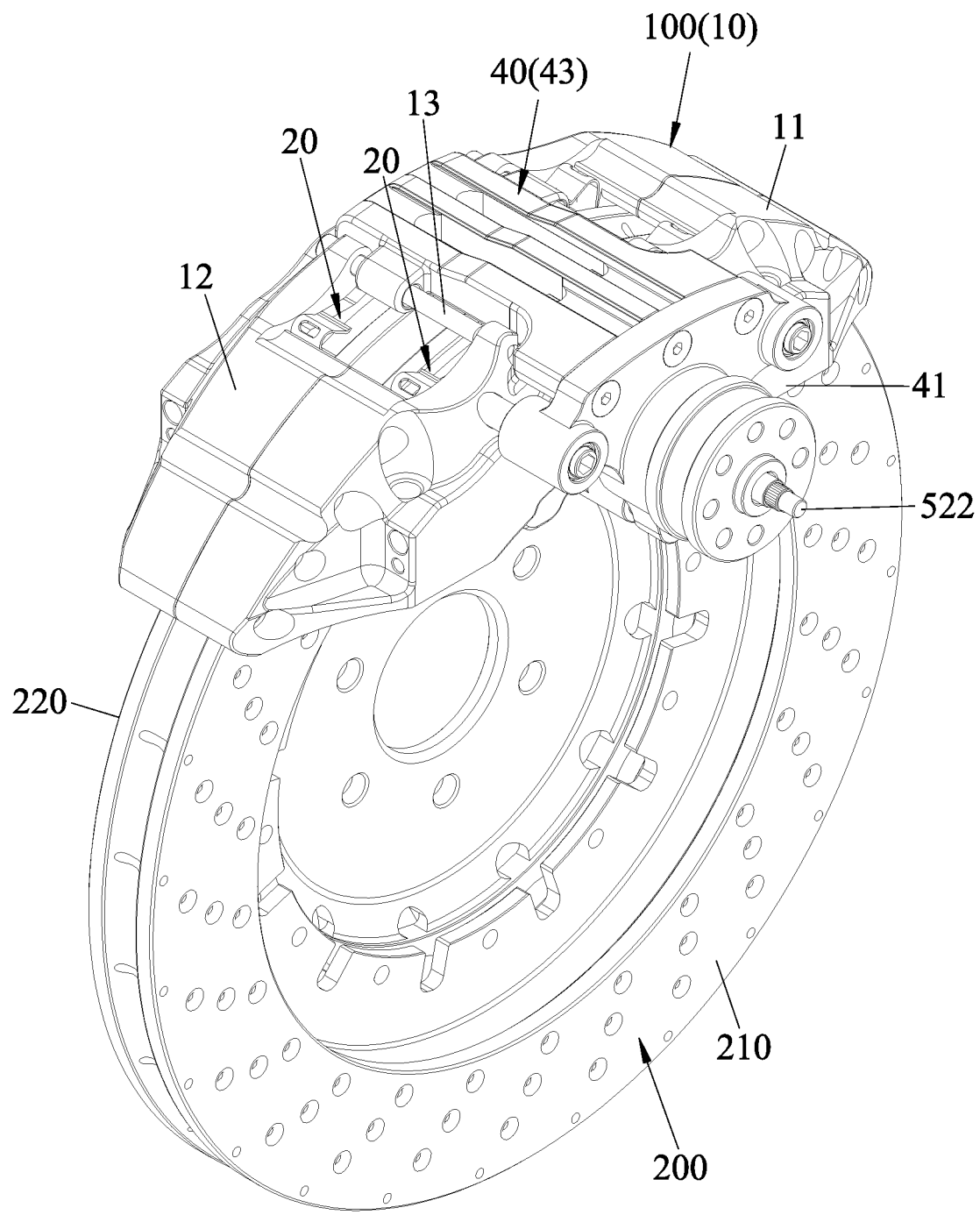
FIG. 1 is a perspective view of an embodiment of a brake caliper device according to the disclosure.
Figure 2:
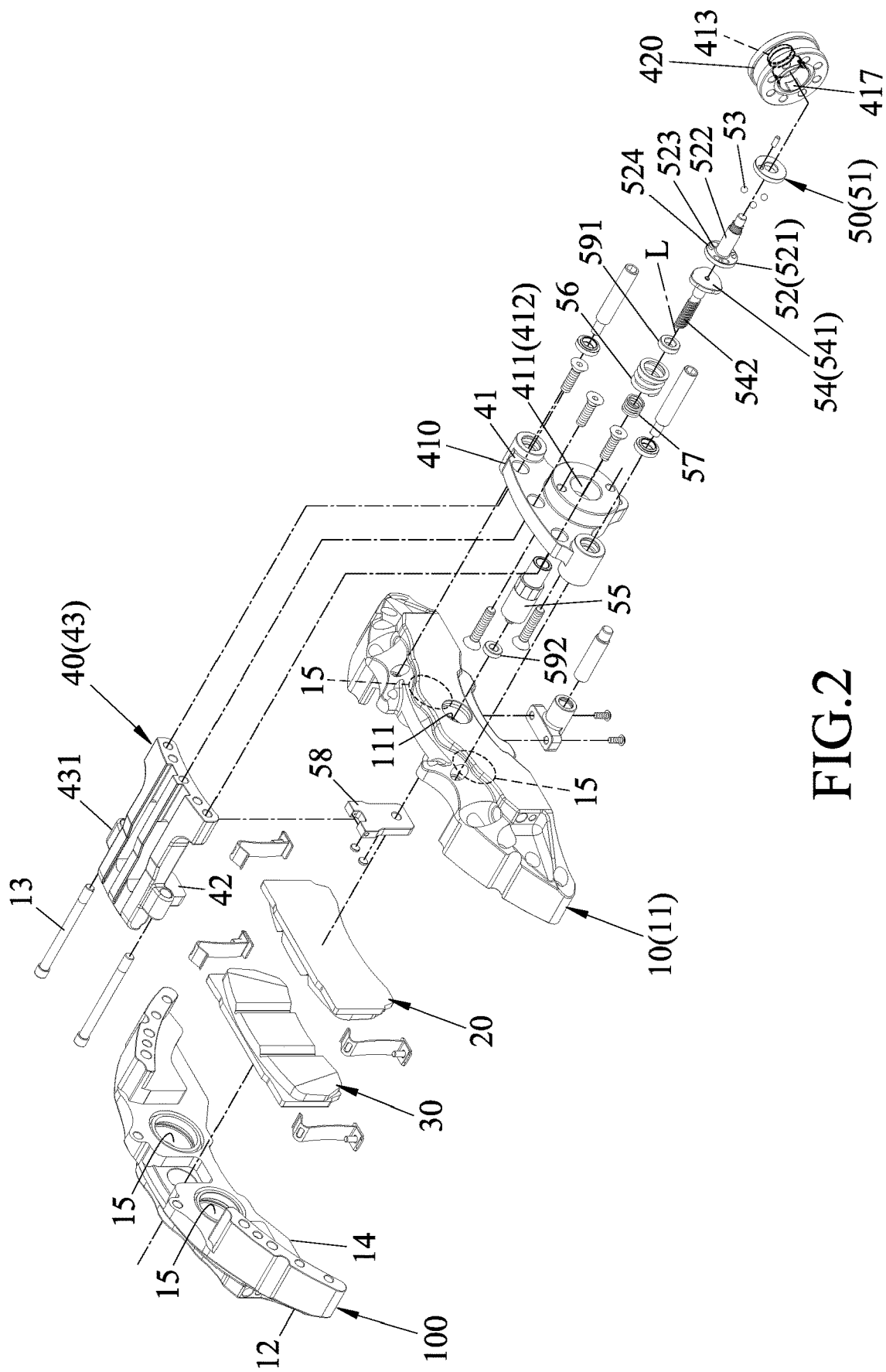
FIG. 2 is an exploded perspective view of the embodiment.
Figure 3:
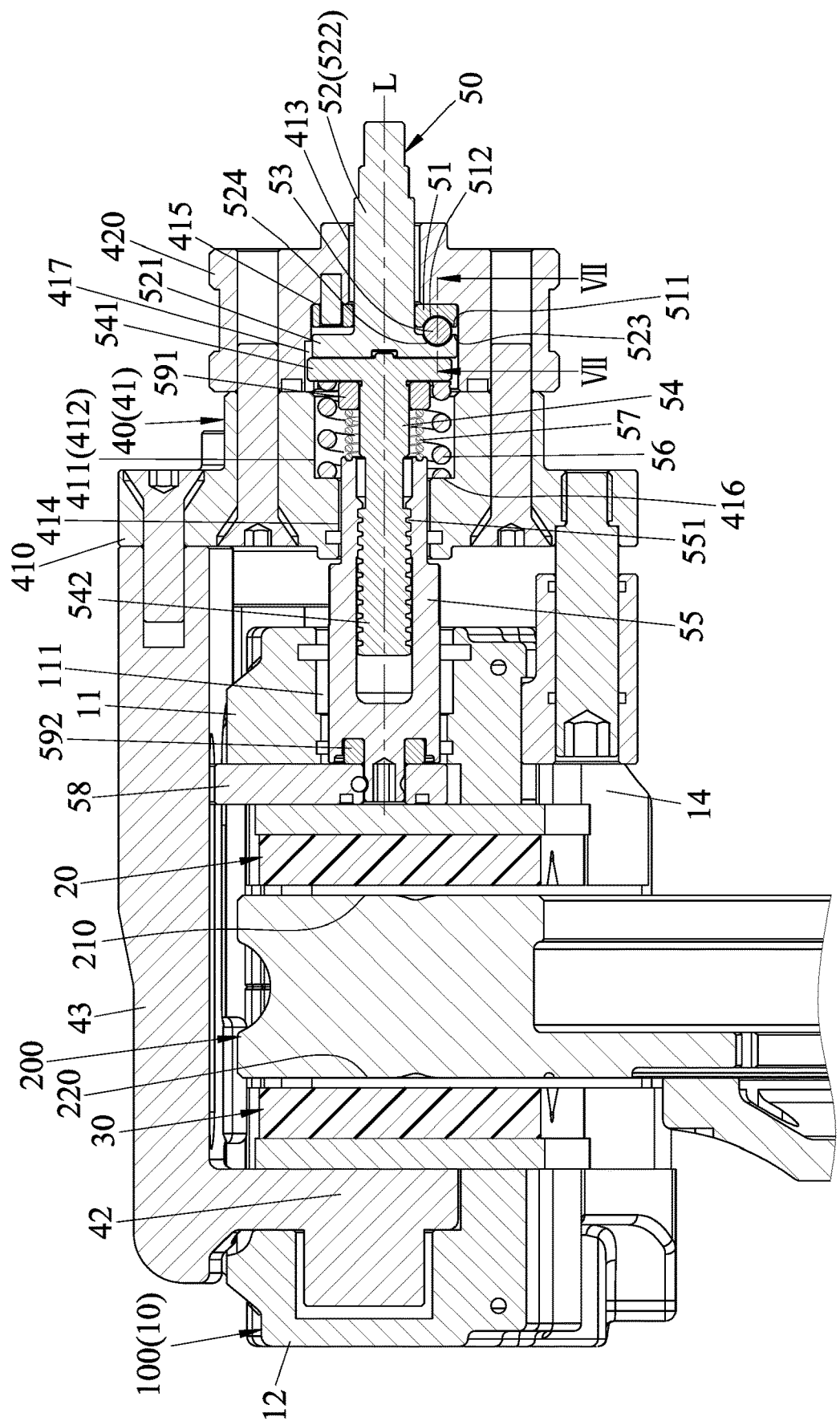
FIG. 3 is a schematic sectional view of the embodiment.

Referring to FIGS. 1 to 3, an embodiment of a brake caliper device 100 according to the disclosure is adapted to be used with a brake disk 200. The brake disk 200 has a first side surface 210, and a second side surface 220 opposite to the first side surface 210. The brake caliper device includes a main body unit 10, a first pad 20, a second pad 30, a pad squeezing unit 40, and a caliper actuator unit 50.

The main body unit 10 includes a first seat 11 that is adapted to be disposed proximally to the first side surface 210 of the brake disk 200, a second seat 12 that is co-movably connected to the first seat 11 and that is adapted to be disposed proximally to the second side surface 220 of the brake disk 200, and two guiding rods 13 that interconnect the first and second seats 11, 12. The first and second seats 11, 12 cooperatively define a receiving space 14 therebetween for receiving a part of the brake disk 200. The first seat 11 is formed with amounting hole 111 extending along a mounting axis (L) and in spatial communication with the receiving space 14. In addition, each of the first and second seats 11, 12 is formed with two cylindrical grooves 15 that are for piston units (not shown) to be installed thereto to drive the first and second pads 20, 30. The mechanism by which the piston units drive the first and second pads 20, 30 is not the subject of this disclosure, and is therefore not further described.

The first pad 20 is adapted to be disposed between the first seat 11 and the first side surface 210 of the brake disk 200, and the second pad 30 is adapted to be disposed between the second seat 12 and the second side surface 220 of the brake disk 200.

The pad squeezing unit 40 is slidably coupled to the main body unit 10 to slide along the mounting axis (L), and includes a fixed seat 41 that is disposed at an outer side of the first seat 11 opposite to the receiving space 14, a movable seat 42 that is disposed between the second seat 12 and the second pad 30, and a connecting member 43 that interconnects the fixed and movable seats 41, 42. The fixed seat 41 has an inner body 410 that is connected to the connecting member 43 and an outer seat body 420 that is coupled to a side of the inner seat body 410 distal from the connecting member 43, and is formed with a central hole 411 that is centered at the mounting axis (L) and that extends through the inner sea body 410 and the outer seat body 420. The central hole 411 includes an enlarged section 412 that is defined by the inner and outer seat bodies 410, 420, a front shrunk section 413 that extends along the mounting axis (L) from a side of the enlarged section 412 through the outer seat body 420, a rear shrunk section 414 that extends along the mounting axis (L) from a side of the enlarged section 412 distal from the front shrunk section 413 through the inner seat body 410, a front shoulder surface 415 that is formed on the outer seat body 420 and that interconnects the enlarged section 412 and the front shrunk section 413, and a rear shoulder surface 416 that is formed on the inner seat body 410 and that interconnects the enlarged section 412 and the rear shrunk section 414. The enlarged section 412 has a non-circular part 417 proximate to the front shoulder surface 415. The connecting member 43 has two guiding slots 431 that permit the guiding rods 13 to respectively and slidably extend therethrough.

The caliper actuator unit 50 is mounted to the mounting hole 111 of the first seat 11 and the central hole 411 of the fixed seat 41, and includes a positioning member 51, an actuating member 52, a plurality of roller members 53 that are disposed between the positioning member 51 and the actuating member 52, a bolt member 54 that abuts against the actuating member 52, a threaded sleeve 55 that is threadedly engaged to the bolt member 54, a restoring member 56, a resilient member 57, a push block 58 that is fixed to the first pad 20, a first bearing 591 that is mounted between the bolt member 54 and the resilient member 57, and a second bearing 592 that is mounted between the threaded sleeve 55 and the push block 58.

The positioning member 51 is fixed to the fixed seat 41, abuts against the front shoulder surface 415, and is disposed at a side of the actuating member 52. Specifically, the positioning member 51 is mounted to the enlarged section 412 of the fixed seat 41, and is fixed to the front shoulder surface 415 such that the positioning member 51 is nonrotatable. The positioning member 51 has a first side surface 511 that faces the actuating member 52 and that are formed with a plurality of angularly and equidistantly spaced-apart first grooves 512 surrounding the mounting axis (L).

Figure 7:
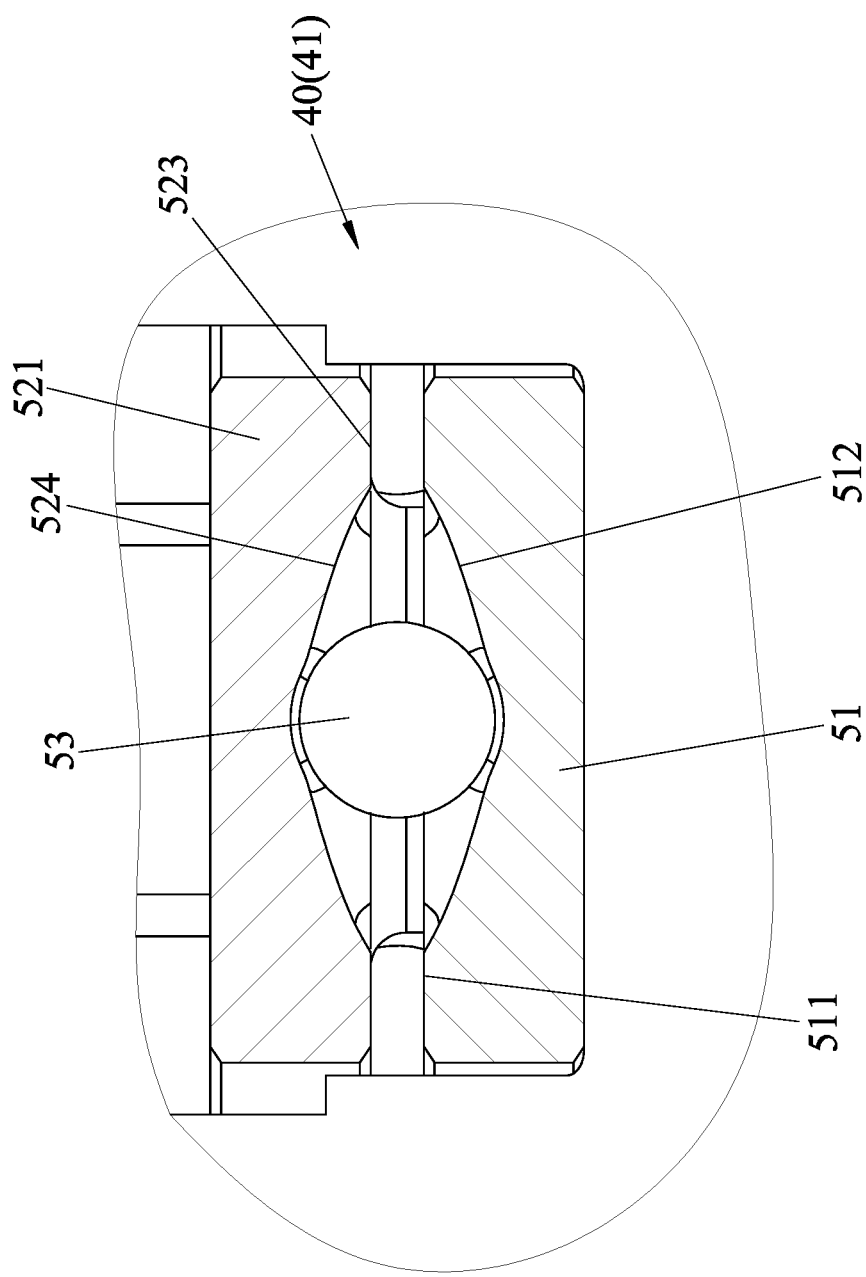
FIG. 7 is a view taken along line VII-VII in FIG. 3.

The actuating member 52 extends along the mounting axis (L), is rotatable relative to the positioning member 51, and is mounted to the central hole 411 of the fixed seat 41. Specifically, the actuating member 52 has an actuating disk 521 that is mounted to the enlarged section 412 of the fixed seat 41 and that is proximate to the positioning member 51, and an actuating rod 522 that is connected to the actuating disk 521 and that extends through the front shrunk section 413. The actuating disk 521 has a second side surface 523 that faces the positioning member 51 and that are formed with a plurality of angularly and equidistantly spaced-apart second grooves 524 surrounding the mounting axis (L). In the embodiment, each of the first and second grooves 512, 524 is elongated, extends about the mounting axis (L), and has a groove depth that varies in the extending direction thereof. Specifically, the groove depth is largest at a middle part of each of the first and second grooves 512, 524, and decreases gradually away from the middle part (See FIG. 7). The actuating rod 522 extends through the front shrunk section 413 in such a way that a portion thereof is exposed to the external environment.

The roller members 53 are respectively nested in the first grooves 512, with exposed ends thereof in contact with the actuating member 52. When the actuating member 52 rotates relative to the positioning member 51, the second grooves 524 are permitted to be nested or to be unnested from the roller members 53.

The bolt member 54 is mounted to the central hole 411 of the fixed seat 41. Specifically, the bolt member 54 has an abutment disk 541 that abuts against the actuating member 52 in the enlarged section 412 of the fixed seat 41, and a threaded rod portion 542 that is connected to the abutment disk 541 and that extends away from the actuating member 52. The abutment disk 541 has a non-circular cross-sectional shape that corresponds in shape to the non-circular part 417 of the enlarged section 412, such that the bolt member 54 is nonrotatable relative to the fixed seat 41.

The threaded sleeve 55 is slidably mounted between the central hole 411 of the fixed seat 41 and the mounting hole 111 of the first seat 11, and is formed with a threaded hole 551 that threadedly engage the threaded rod portion 542 of the bolt member 54.

The restoring member 56 is a compression spring that has two opposite ends respectively abutting against the rear shoulder surface 416 of the first seat 41 and the abutment disk 541 of the bolt member 54, and that generates a restoring force for resiliently pushing the actuating disk 521 of the actuating member 52 to be in contact with the positioning member 51. The resilient member 57 has two opposite ends respectively abutting against the abutment disk 541 of the bolt member 54 (via the first bearing 591 as shown in FIG. 3) and the threaded sleeve 55 for pushing the threaded sleeve 55 away from the abutment disk 541 of the bolt member 54 and toward the first pad 20. The push block 58 is fastened to the first pad 20 and provides a larger contact surface area between the threaded sleeve 55 and the first pad 20.

The first and second bearings 591, 592 are thrust bearings, with the first bearing 591 mounted between the abutment disk 541 of the bolt member 54 and the resilient member 57. The first and second bearings 591, 592 enable free rotation of the threaded sleeve 55 relative to the bolt member 54.

Referring back to FIGS. 1 to 3, after the brake caliper device 100 is fully assembled and is fixedly mounted to the brake disk 200, in a normal circumstance where the brake caliper device is not activated, there exists gaps respectively between the first side surface 210 and the first pad 20, and between the second side surface 220 and the second pad 30, thereby allowing the brake disk 200 to freely rotate.

Figure 4:
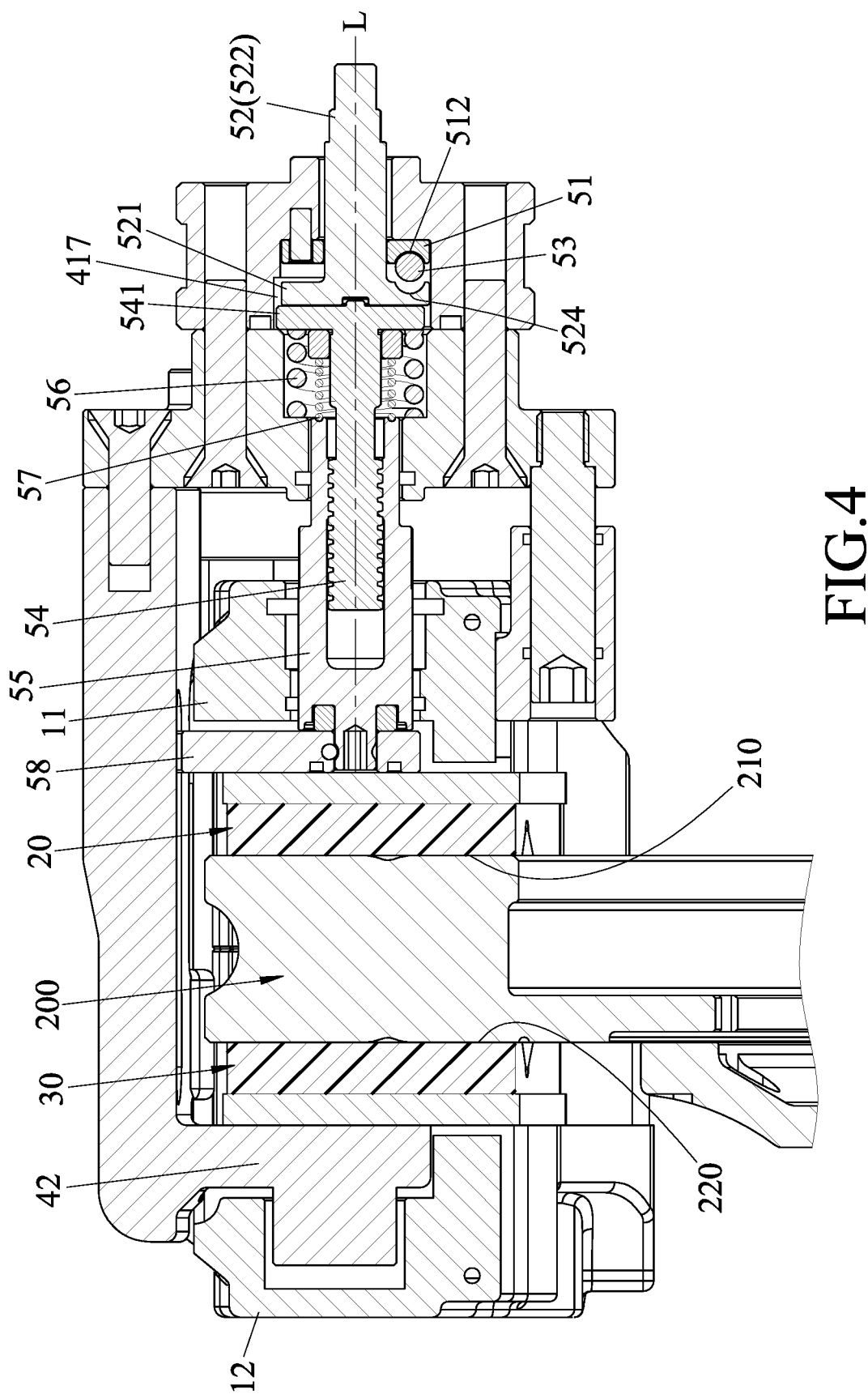
FIG. 4 is a view similar to FIG. 3, illustrating the embodiment in a braking state.

Referring to FIG. 4, when a user applies an external force (via handbrake) to rotate the actuating rod 522 of the actuating member 52, exposed ends of the roller members 53, which are nested in the first grooves 512 of the positioning member 51, would constantly be in contact with and be nested in and out of the second grooves 524 of the actuating member 52 (as long as the second grooves 524 revolves around the mounting axis (L)), and push the actuating disk 521 axially away from the positioning member 51 whenever the roller members 53 are not nested in the second grooves 524. Whenever the actuating member 52 is driven to move along the mounting axis (L), the restoring member 56 is prompted to generate the restoring force to push the actuating disk 521 toward the positioning member 51. The exchange of these two opposing forces generates axial vibration of the actuating member 52 for driving reciprocating displacement thereof along the mounting axis (L). As the bolt member 54 is unable to rotate, the axial vibration from the actuating member 52 is directly transferred to the bolt member 54 and the threaded sleeves 55 to push the first pad 20 toward the first side surface 210 and the second pad 30 toward the second side surface 220 for braking. While the abutment disk 541 of the bolt member 54 receives the axial vibration from the actuating member 52, the threaded sleeve 55 does not rotate relative to the bolt member 54 if the first and second pads 20, 30 are not worn enough (as shown in FIG. 4), as there are not enough space for facilitating axial movement of the threaded sleeve 55 relative to the abutment disk 541 of the bolt member 54 via threaded rotation. While in a braking state, the gaps directly adjacent to the brake disk 200 disappear, while new gaps appear between the first seat 11 and the push blocks 58 and between the second seat 12 and the movable seat 42.

Figure 5:
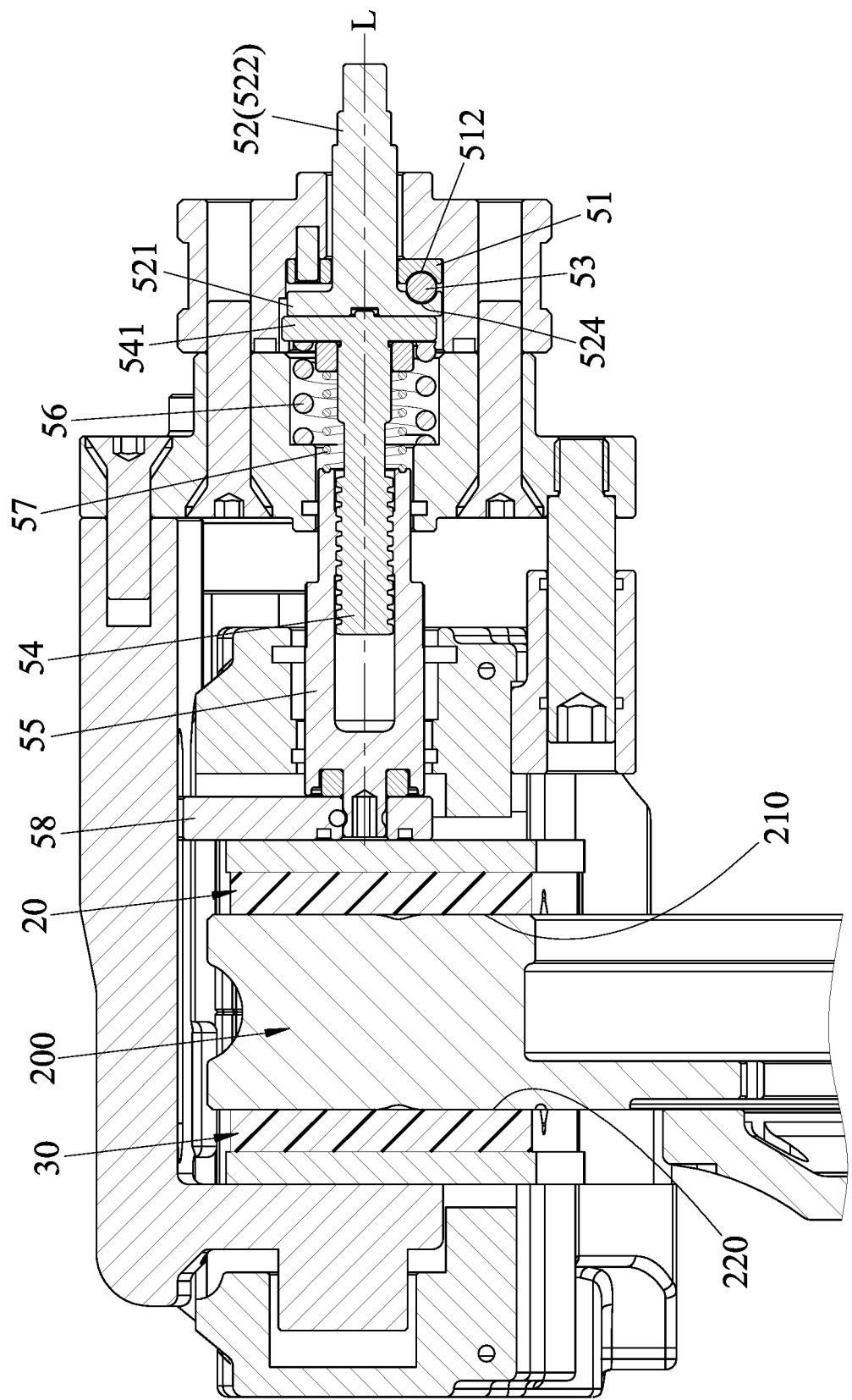
FIGS. 5 and 6 are views similar to FIG. 3, illustrating the embodiment undergoing automatic pad wear compensation.
Figure 6:
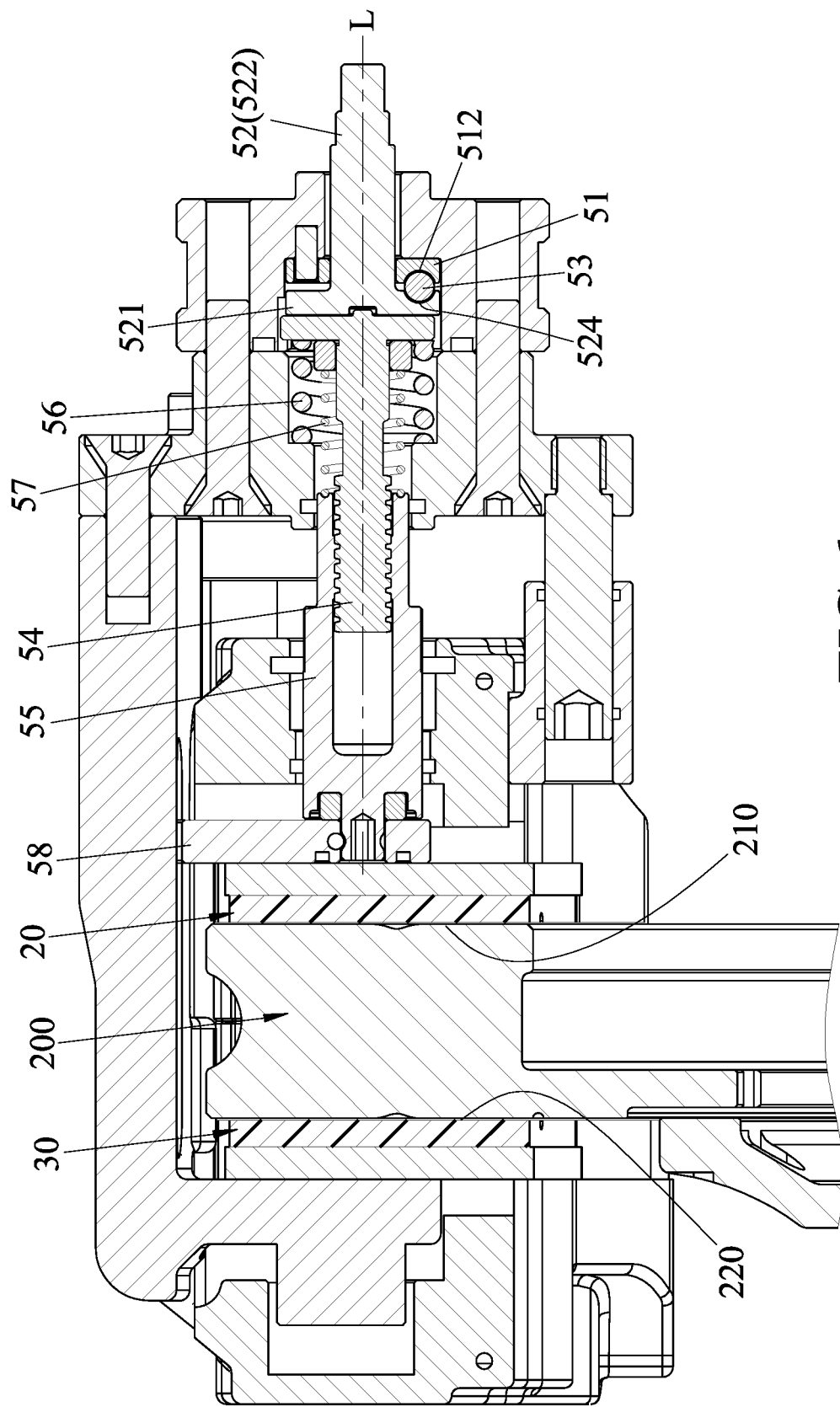

Referring to FIGS. 5 and 6, when the first and second pads 20, 30 are worn, when the user performed the abovementioned operation again, due to the larger gaps caused by pad wear and due to the presence of backlash between the threaded hole 551 of the threaded sleeve 55 and the threaded rod portion 542 of the bolt member 54, the threaded sleeve 55 is prompted by the axial vibration of the bolt member 54 to rotate for pushing the first pad 20 via the push block 58 toward the brake disk 200, thereby automatically providing a travel stroke that compensates for pad wear. At the same time, when the threaded sleeve 55 is driven to push the first pad 20 to the brake disk 200, the second pad 30 is also pushed via the pad squeezing unit 40 toward the brake disk 200 for automatically providing a travel stroke that compensates for pad wear.

Overall, when the user rotates the actuating rod 522 of the actuating member 52, the vibrational force generated by the positioning member 51, the actuating member 52 and the roller members 53 of the caliper actuator unit 50 enables rotation of the threaded sleeve 55 relative to the bolt member 54, automatically providing a travel stroke to compensates for pad wear.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A brake caliper device adapted to be used with a brake disk, the brake disk having a first side surface and a second side surface opposite to the first side surface, said brake caliper device comprising:
    a main body unit including
        a first seat that is adapted to be disposed proximally to the first side surface of the brake disk, and that is formed with a mounting hole extending along a mounting axis, and
        a second seat that is co-movably connected to said first seat, that is adapted to be disposed proximally to the second side surface of the brake disk, and that cooperates with said first seat to define a receiving space therebetween for receiving a part of the brake disk;
    a first pad that is adapted to be disposed between said first seat and the first side surface of the brake disk;
    a second pad that is adapted to be disposed between said second seat and the second side surface of the brake disk; and
    a caliper actuator unit mounted to said mounting hole of said first seat and including
        an actuating member,
        a bolt member that abuts against said actuating member, and
        a threaded sleeve that is threadedly engaged to said bolt member;
    wherein, when said actuating member is driven by an external force, said actuating member is capable of vibrating axially to cause an axial vibration of said bolt member, which prompts said threaded sleeve to rotate relative to said bolt member for pushing said first pad toward the brake disk, thereby automatically providing a travel stroke that compensates for pad wear.

2. The brake caliper device as claimed in claim 1, further comprising:
    a pad squeezing unit slidably coupled to said main body unit to slide along the mounting axis, and including a fixed seat that is formed with a central hole centered at the mounting axis and that is disposed at an outer side of said first seat opposite to said receiving space, a movable seat that is disposed between said second seat and said second pad, and a connecting member that interconnects said fixed and movable seats;
    wherein, said actuating member and said bolt member are mounted to said central hole of said fixed seat, and said threaded sleeve is slidably mounted between said central hole of said fixed seat and said mounting hole of said first seat; and
    wherein, when said threaded sleeve is driven to push said first pad to the brake disk, said second pad is also pushed via the pad squeezing unit toward the brake disk for automatically providing a travel stroke that compensates for pad wear.

3. The brake caliper device as claimed in claim 2, wherein:
    said caliper actuator unit further includes a positioning member fixed to said fixed seat and disposed at a side of said actuating member, and a plurality of roller members that are disposed between said positioning member and said actuating member;

said positioning member has a first side surface that faces said actuating member and that are formed with a plurality of angularly spaced-apart first grooves surrounding the mounting axis;

said actuating member has a second side surface that faces said positioning member and that are formed with a plurality of angularly spaced-apart second grooves surrounding the mounting axis;

said roller members are respectively nested in said first grooves, with exposed ends thereof in contact with said actuating member for driving reciprocating displacement of said actuating member along the mounting axis to generate vibration force; and said brake caliper device further comprises a restoring member that resiliently abuts against said first seat and said bolt member, and that generates a restoring force for pushing said actuating member to be in contact with the positioning member whenever said actuating member is driven to move along the mounting axis.

4. The brake caliper as claimed in claim 3, wherein each of said first and second grooves is elongated, extends about the mounting axis, and has a groove depth that varies in the extending direction thereof.

5. The brake caliper as claimed in claim 4, wherein the groove depth is largest at a middle part of each of said first and second grooves, and decreases gradually in two opposite angular directions from said middle part.

6. The brake caliper as claimed in claim 3, wherein:
said first grooves are equidistantly spaced-apart; and
said second grooves are equidistantly spaced-apart.

7. The brake caliper as claimed in claim 3, wherein said caliper actuator unit further includes a resilient member that is resiliently disposed between said bolt member and said threaded sleeve for pushing said threaded sleeve toward said first pad, and a push block that is fixed to said first pad.

8. The brake caliper as claimed in claim 7, wherein said caliper actuator unit further includes a first bearing mounted between said bolt member and said resilient member, and a second bearing mounted between said threaded sleeve and said push block.

9. The brake caliper as claimed in claim 8, wherein:
said bolt member of said caliper actuator unit has an abutment disk that abuts against said actuating member and a threaded rod portion that is connected to said abutment disk; and
said first and second bearings are thrust bearings, and said first bearing is mounted between said abutment disk of said bolt member and said resilient member.

10. The brake caliper as claimed in claim 9, wherein:
said fixed seat has an inner seat body that is connected to said connecting member and an outer seat body that is coupled to a side of said inner seat body distal from said connecting member;
said central hole extends through said inner seat body and said outer seat body, and includes an enlarged section that is defined by said inner and outer seat bodies; and
said enlarged section has a non-circular part defined by an inner surface of said outer seat body, said abutment disk having a non-circular cross-sectional shape that corresponds in shape to said non-circular part of said enlarged section for restricting rotation of said bolt member.

* * * * *